US006671766B1

(12) United States Patent
Vandenbergh et al.

(10) Patent No.: US 6,671,766 B1
(45) Date of Patent: Dec. 30, 2003

(54) METHOD AND SYSTEM FOR IMPLEMENTING MEMORY EFFICIENT TRACK AGING

(75) Inventors: Henk Vandenbergh, Lafayette, CO (US); Michael Steven Milillo, Louisville, CO (US); Gregory William Peterson, Lyons, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/479,539

(22) Filed: Jan. 7, 2000

(51) Int. Cl.[7] .............................................. G06F 12/12
(52) U.S. Cl. ....................... 711/16 C; 711/136; 711/134
(58) Field of Search .................................. 711/159, 160, 711/133, 134, 135, 136, 154, 156, 158, 112

(56) References Cited

U.S. PATENT DOCUMENTS

| 4,811,203 A | * | 3/1989 | Hamstra ...................... 711/172 |
| 5,134,696 A | * | 7/1992 | Brown et al. .................. 711/3 |
| 5,434,992 A | | 7/1995 | Mattson |
| 5,761,738 A | * | 6/1998 | Jones ......................... 711/170 |

FOREIGN PATENT DOCUMENTS

| EP | 0 509 231 | 10/1992 |
| GB | 2 127 189 | 4/1984 |

OTHER PUBLICATIONS

"Implementing Global Memory Management in a Workstation Cluster"; Operating Systems Review (SIGOPS), US, ACM Headquarter, New York, vol. 29, No. 5, Dec. 1, 1995.

* cited by examiner

Primary Examiner—Matthew Kim
Assistant Examiner—Matthew D. Anderson
(74) Attorney, Agent, or Firm—Carstens, Yee & Cahoon, LLP

(57) ABSTRACT

Each time a track is referenced, a value representing the last referenced age is entered for a track entry in a last referenced age table (LRAT). The last referenced age table is indexed by track. A second table, an age frequency table (AFT), counts all segments in use in each reference age. The AFT is indexed by the reference age of the tracks. When a track is referenced, the number of segments used for the track is added to a segment count associated with the last referenced age of the track. The segment count tallies the total number of segments in use for the reference age for all tracks referenced to that age. The number of segments used for the previous last referenced age of the track is subtracted from the segment count associated with the previous last referenced age in the AFT. When free_space is needed, tracks are discarded from the LRAT by reference age, the oldest first. The range of ages to be discarded in the LRAT is calculated in the AFT by counting the total amount of segments used by each reference age until the total number of segments needed is realized. Counting is started at the AFT entry with the oldest reference age. The reference age of the last counted entry in the AFT is the discard age. The LRAT is scanned for reference ages between the old age, and those reference ages are discarded.

50 Claims, 15 Drawing Sheets

**MOST RECENTLY USED/
LEAST RECENTLY USED TABLE**
(MRU/LRU Table)

MRU/LRU
200

Anchor
250

Foward pointer: points to most recently used entry (MRU)
Backward pointer: points to least recently used entry (LRU)

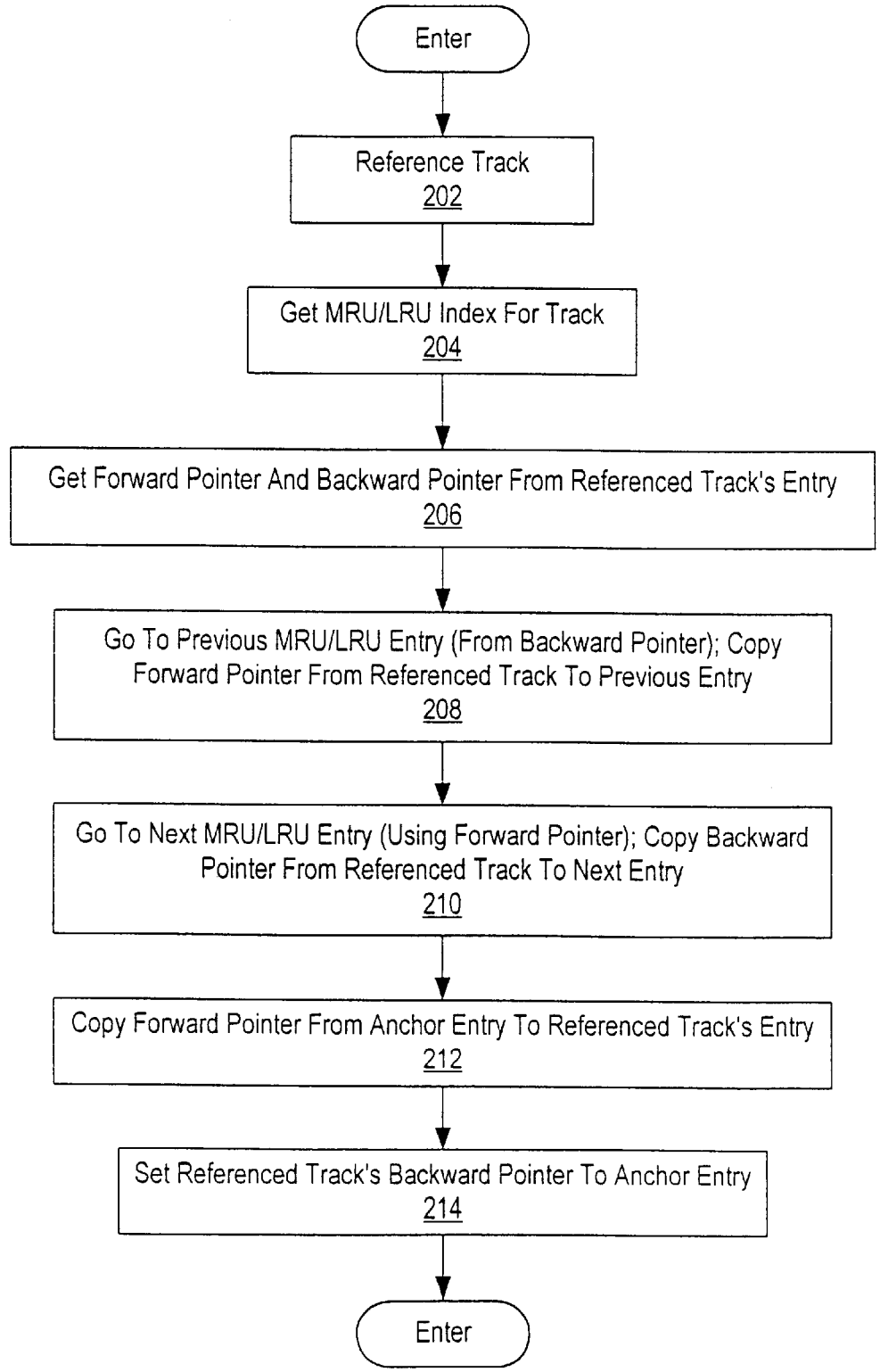

Prior Art Track Directory
600

99-074-ICE
Track Directory
650

METHOD AND SYSTEM FOR IMPLEMENTING MEMORY EFFICIENT TRACK AGING

BACKGROUND OF THE INVENTION

1. Technical Field

The present invention relates to the storage of disk tracks in a cache. More particularly, the present invention relates to a method and system for efficiently aging cached tracks.

2. Description of Related Art

With the reduced cost of memory chips, cache sizes have increased into the tens of gigabytes. While this has allowed improved disk subsystem performance by increasing cache hits for larger working sets and workloads, the amount of controller memory required to manage this amount of cache has also increased accordingly. Even though the cost of memory is declining, there are two good reasons for minimizing the amount of controller memory required to support large cache sizes. First, it is still desirable to minimize the amount of controller memory needed for the subsystem since this cost is a constant that is invariant with the size of the customer purchased cache size. A memory size required to handle the largest cache size may be a price barrier to an entry-level subsystem that has a small amount of cache. Second, due to the legacy of subsystems already in the field, the requirement to increase the controller memory just to increase cache size results in a significant increase to the installation cost, with the added expense of controller memory upgrade kits.

For current subsystems, the amount of controller memory required to manage 3 gigabytes of cache is 2304 kilobytes. A cache of 6 GB will require 4608 KB of controller memory. This amount of memory is not available on some current subsystems.

SUMMARY OF THE INVENTION

The present invention relates to a system and method for memory efficient track aging. Each time a track is referenced, a value representing the reference age is entered for a track entry in a last referenced age table (LRAT). A reference age is not a real age but merely a relative age between the two preset values. The last referenced age table is indexed by track. A second table, an age frequency table (AFT), counts all segments in use in each reference age. The AFT is indexed by the reference age of the tracks. When a track is referenced, the number of segments used for the track is added to a segment count associated with the last referenced age of the track. The segment count tallies the total number of segments in use for the reference age for all tracks referenced using that age. The number of segments used for the previous last referenced age of the track is subtracted from the segment count associated with the previous last referenced age in the AFT. When free_space is needed, tracks are discarded from the LRAT by reference age, the oldest first. The range of ages to be discarded in the LRAT is calculated in the AFT by counting the total amount of segments used by each reference age until the total number of segments needed to bring the free_space back into a threshold range is realized. Counting is started at the AFT entry with the oldest reference age. The reference age of the last counted entry in the AFT is the discard age. The LRAT is scanned for reference ages between the old age and the discard age and those reference ages are discarded.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2B depicts a processing for referencing tracks using a prior art MRU/LRU table;

DETAILED DESCRIPTION OF THE PREFERRED EMBODIMENT

Figure 1:
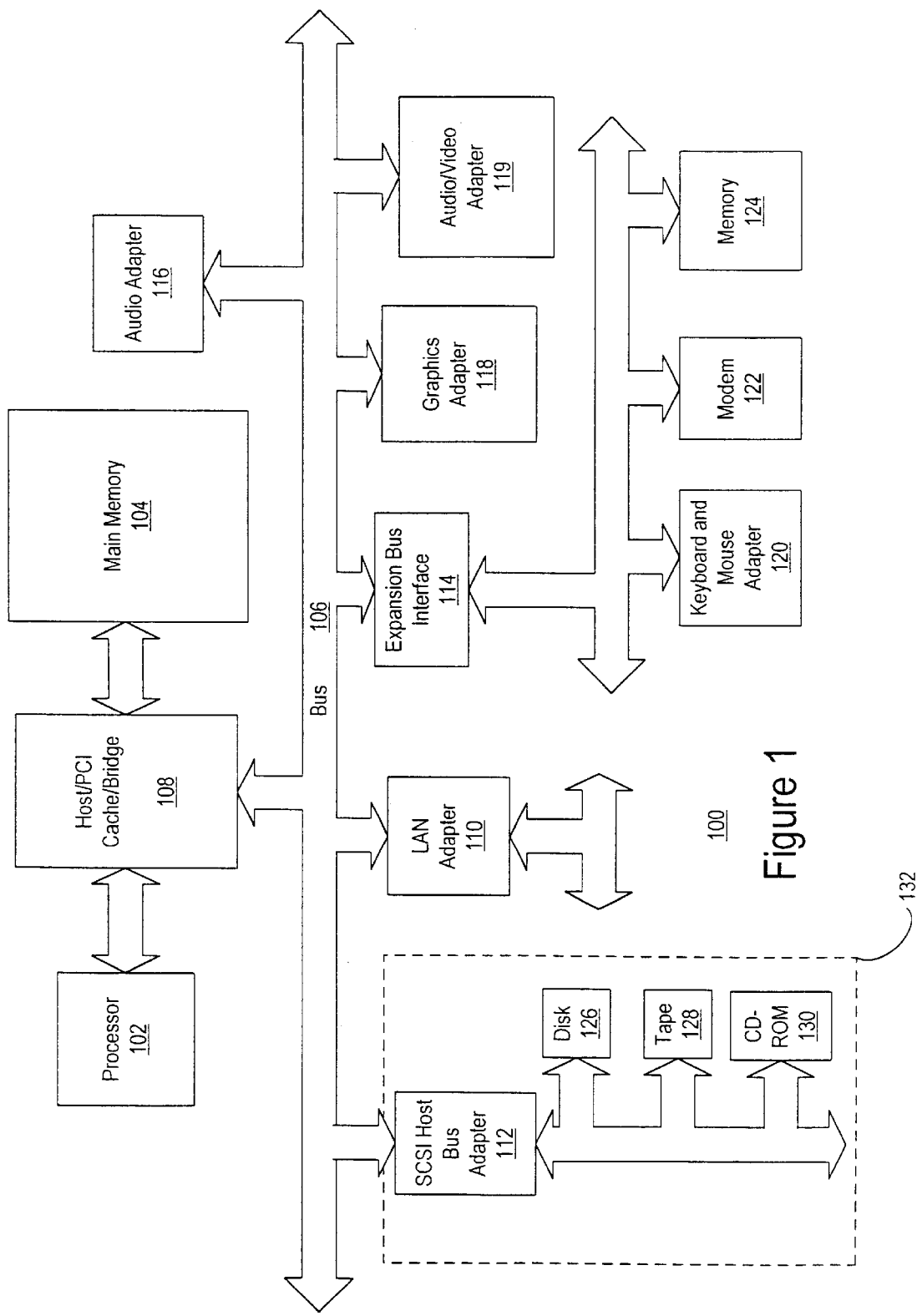
FIG. 1 is a block diagram illustrating a data processing system in which the present invention may be implemented.

With reference now to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures, such as Micro Channel and ISA, may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In addition, audio adapter 116, graphics adapter 118, and audio/video adapter 119 are connected to PCI local bus 106 by add-in boards. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations support three or four PCI expansion slots or add-in connectors.

An operating system runs on processor 102 and is used to coordinate and provide control of various components within data processing system 100 in FIG. 1. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1, denoting optional inclusion. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide nonvolatile memory for storing operating system files and/or user-generated data.

Data read from tracks on disk 126 or CD-ROM 130 may temporarily be stored in a memory cache located in main memory 104 or possibly some extended memory such as memory 124. In so doing, the data contents of the track is available to processor 102 without the expense associated with accessing the data from the disk.

The depicted example in FIG. 11, as well as above-described examples, are not meant to imply architectural limitations.

Figure 2A:
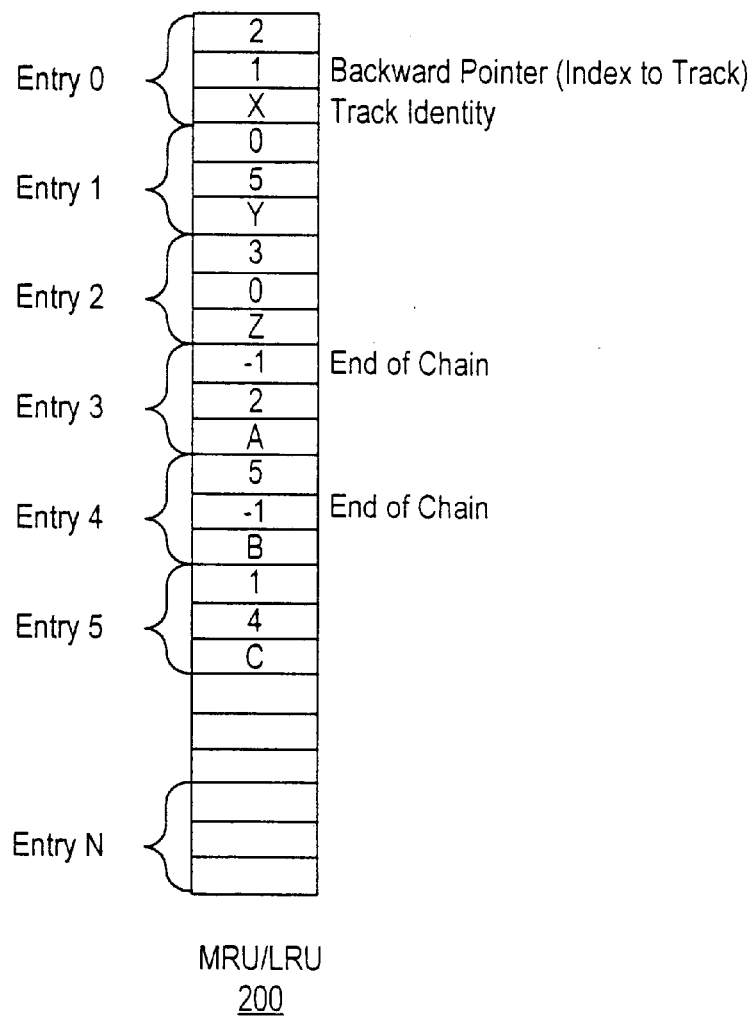
FIG. 2A is a typical MRU/LRU table (most recently used/least recently used) which may be stored in a processor cache.

FIG. 2A is a typical MRU/LRU table (most recently used/least recently used) which may be stored in a processor memory. The prior art MRU/LRU table 200 contains one entry for each track held in cache. Each entry holds three segments of information, a forward pointer, a backward pointer and a track identifier. Associated with prior art MRU/LRU 200 is anchor 250 which hold a forward point to the most recently used (MRU) entry in table 200 and a backward pointer to the least recently used (LRU) entry in table 200. Anchor 250 is the forward and backward starting point for track lists. In the present example, table 200 has a forward list order of: 4(anchor), 5, 0, 2, 3, 1, which correspond to the most recently used (MRU) tracks of: B, C, Y, X, Z, A. Conversely table 200 has a backward list order of: 3(anchor), 2, 0, 1, 5, 4, which correspond to the least recently used (LRU) tracks of: A, Z, X, Y, C, B. Problems associated with the prior art MRU/LRU depicted in FIG. 2A include the memory requirement for supporting a large memory cache.

FIG. 2B depicts a processing for referencing tracks using a prior art MRU/LRU table. Essentially, the process merely moves the position of a referenced track to the head of the forward list. The process begins with a track being referenced (step 202). The MRU/LRU entry for the referenced track is then determined (step 204) and the forward and backward pointers from the referenced track's entry in the MRU/LRU are read (step 206). Next, the forward pointer of the referenced track is copied to the forward pointer entry of the track entry defined by the backward pointer of the referenced track (step 208). Correspondingly, the backward pointer of the referenced track is copied to the backward pointer entry of the track entry defined by the forward pointer of the referenced track (step 210). The forward pointer in the anchor is then replaced with the entry number of the just referenced track. The process the repeats itself for each track being referenced.

Figure 3A:
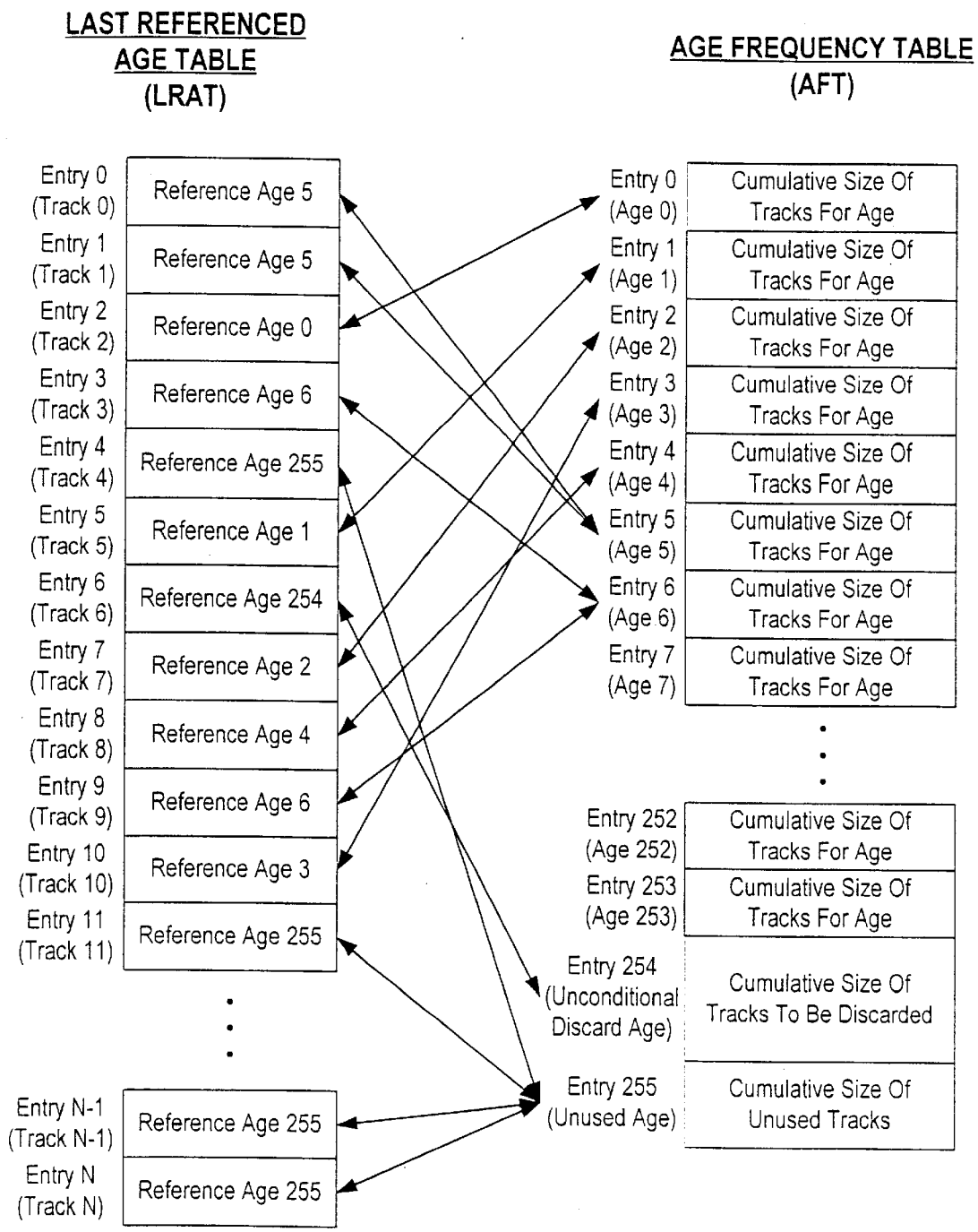
FIG. 3A depicts a novel table structure used for memory efficient track aging (META) utilizing the META mechanism in accordance with a preferred embodiment of the present invention.
Figure 3B:
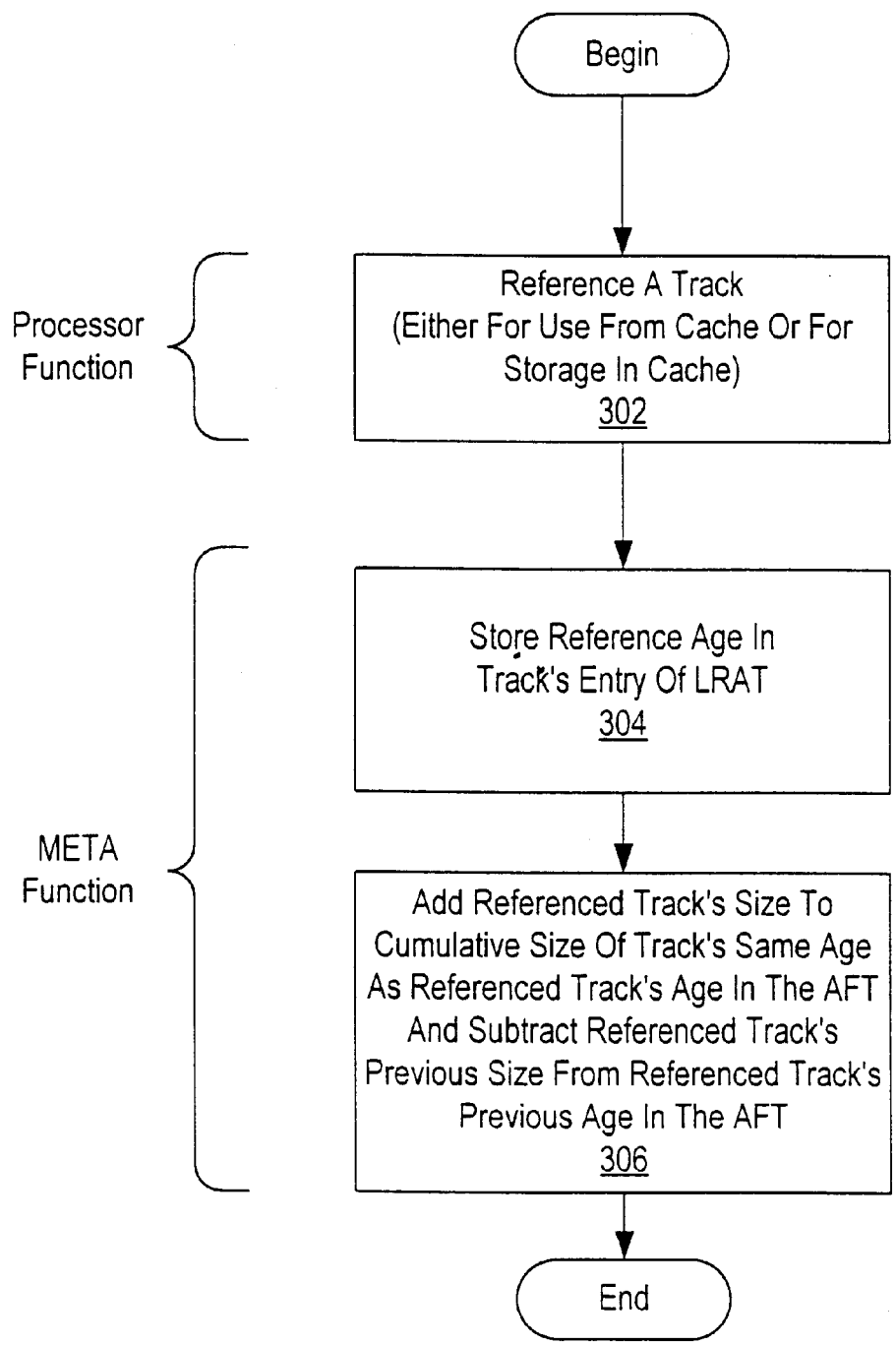
FIG. 3B is a flowchart depicting a memory efficient track aging (META) process utilizing the META mechanism in accordance with a preferred embodiment of the present invention.

Referring to FIGS. 3A and 3B, these figures depict a novel table structure used for memory efficient track aging (META) utilizing the META mechanism in accordance with a preferred embodiment of the present invention. FIG. 3A illustrates the table structures. Unlike the MRU/LRU table structure used for track aging in the prior art, the present invention utilizes two tables for efficiently storing track age data. The tables are the last referenced age table (LRAT) and the age frequency table (AFT).

One of ordinary skill in the art will realize that although a preferred embodiment of the present invention utilizes a "track" as a memory unit for describing the invention, other measurement units, such as sectors, may be substituted without diminishing the usefulness or novelty of the invention. Similarly, the present invention utilizes a "segment" as a memory size measurement unit, which also is merely exemplary. The present invention may be practiced by designating other size measurement units, such as bytes, without diminishing the usefulness or novelty of the invention.

The LRAT has a sufficient number of entries for storing an eight-bit reference age associated with each track referenced by the processor. However, the LRAT may utilize a somewhat lesser number of entries depending on the amount of cache configured in the system. Initially, a track is referenced in cache by a processor. The processor accesses the track's directory for information related to the track. The processor then converts the track identifier taken from the track directory to an entry position in the LRAT. The track's eight-bit last referenced age value or reference age is stored in the track's entry in the LRAT table.

In accordance with a preferred embodiment of the present invention, the AFT track contains 256 entries, each supporting a 4-byte counter. Counter for entries 0–253 store the value of the cumulative size of all tracks referenced during the reference age for the AFT entry. Entry 254 is an unconditional discard age. Unlike entries 0–253, the unconditional discard age is not a true track reference age, but instead the cumulative size of all tracks designated by the processor to be discarded after being referenced. For instance, a track may be referenced by a processor for use only once and thus need not be held in cache for further use. In that case, as a track is referenced in the LRAT, the track is designated with an age of 254, indicating that it will be immediately deleted from the LRAT and not held in cache.

Turning again to the AFT, entry 255 holds the cumulative size of all non-existing tracks. A 255-reference age indicates that a track is not currently being stored in cache. At system start-up no track exists and every entry in the LRAT is referenced to age 255 in the LRAT. Therefore, AFT entry 255 holds the cumulative size of all unused tracks. Therefore, entries 0–254 in the AFT all contain zeros, as no tracks have been referenced thus far.

As a track is referenced by the processor, it is assigned a reference age related to the relative age in which the track was referenced. For instance, entry 2 in the LRAT is given a reference age of 0 indicating that that track was referenced at age 0. Once a track has been referenced, the track size is subtracted from the unused aged entry 255 in the AFT and added to its reference age, in this case entry 0 or age 0. The process continues during age 0 as other tracks may be referenced and then added to the cumulative size of tracks referenced in age 0 of the AFT. At some point the reference age changes and tracks referenced during the next age, age 1, will have their sizes subtracted from the unused entry 255 and added to entry 1 or age 1 of the AFT. Track 5 has been referenced at age 1. The complete track aging process will be described further with respect to FIG. 7.

As mentioned above, a track may be referenced by a processor and then not needed again. In that case, the processor designates the track as having a reference age of 254, or unconditional discard age. Track entry 6 in the LRAT is such an example. Once again, when the track is referenced for the first time in the LRAT, the track's size is subtracted from the unused age entry 255 of the AFT and its size is added to its new reference age, in this case the unconditional discard age, entry 254.

FIG. 3B illustrates the track referencing process in accordance with a preferred embodiment of the present invention. The process begins with a track being referenced (step 302). Track age referencing is a processor function and not the function of the META process. The term "referencing a track" involves either referencing a track that is available in cache, or creating a track in cache. Obviously, if the processor finds that a track is available in cache, there is no need for the processor to access the track from a storage device and create that track in cache. However, the cache has a finite size, therefore, some means must be utilized for ranking the tracks held in cache. The META mechanism performs this process.

Once a track is referenced by the processor, the track's reference age is stored in the track's entry of the LRAT (step 304). The memory efficient track aging (META) function utilizes the LRAT table depicted in FIG. 3A for storing reference ages associated with a track. However, merely identifying the last age in which a track was referenced does not identify how many of the oldest tracks to delete from cache in order to free up needed space in cache. Therefore, in addition to storing the tracks reference age in the LRAT, the track's size is added to the cumulative size of tracks having the same age as the tracks reference age entry in the AFT (step 306). By storing cumulative track sizes for each track age, the META process can easily determine an age range of tracks to delete in order to free up enough space in cache to meet a space requirement. Additionally, the referenced track's previous size is subtracted from the cumulative size of tracks referenced at referenced track's previous referenced age entry in the AFT.

Figure 4:
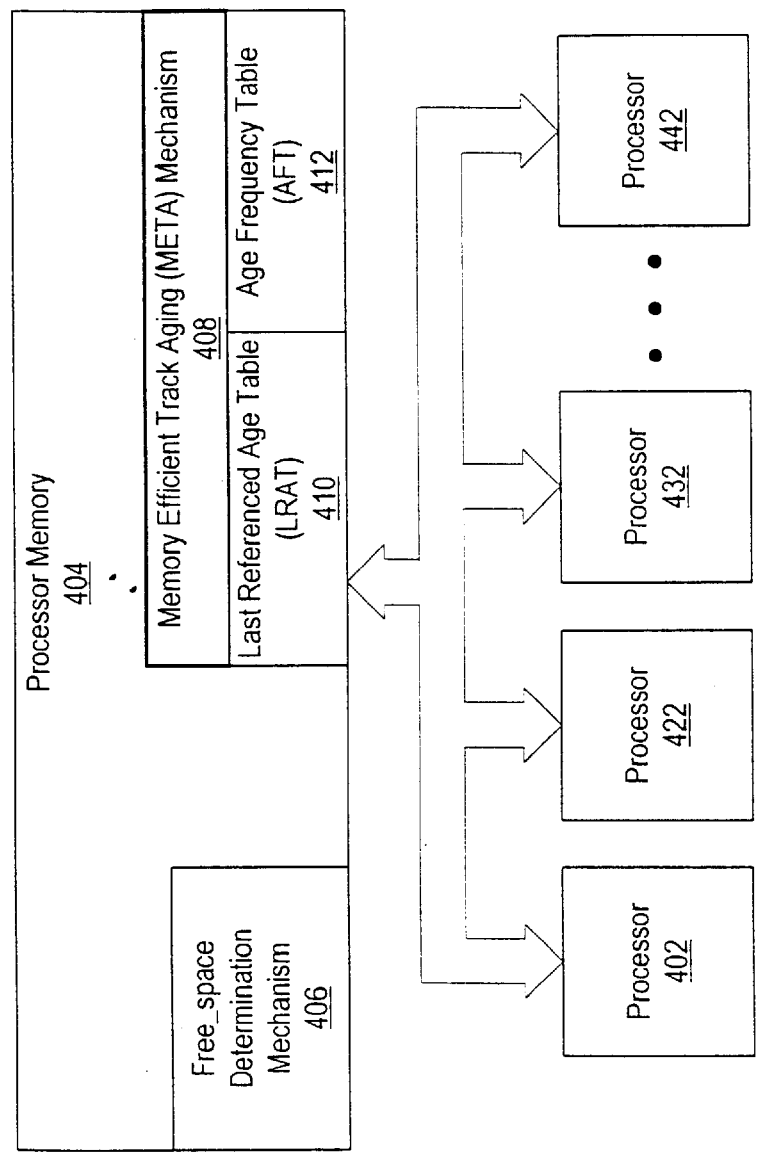
FIG. 4 is a logic diagram depicting the structure of track aging processor used in accordance with a preferred embodiment of the present invention.

FIG. 4 is a logic diagram depicting the structure of track aging processor used in accordance with a preferred embodiment of the present invention. It is important to note that the present invention may be implemented on a single processor or in a multi-processor array. In a single processor arrangement, processor 402 would represent the sole processor. In a multi-processor arrangement, the logic diagram depicted in FIG. 4 illustrates the configuration for each of 'n' processors (402, 422, 432 and 442) in that arrangement.

In accordance with a preferred embodiment of the present invention, each processor, such as processors 402–442, references tracks (or creates) in cache as needed. Each time a track is referenced, one of processors 402, 422, 432 and 442 invokes the META mechanism 408 held in processor memory 404. As discussed above, the META mechanism includes a last referenced age table (LRAT) 410 and an age frequency table (AFT) 412. The META mechanism merely provides a memory efficient means for track aging and does not attempt to calculate free space available in the cache. Therefore, the processor relies on a free space determination mechanism 406 for that calculation. The interaction between free space determination mechanism 406 and the META mechanism 408 will become apparent with a discussion of the following diagrams and flowcharts.

Figure 5:
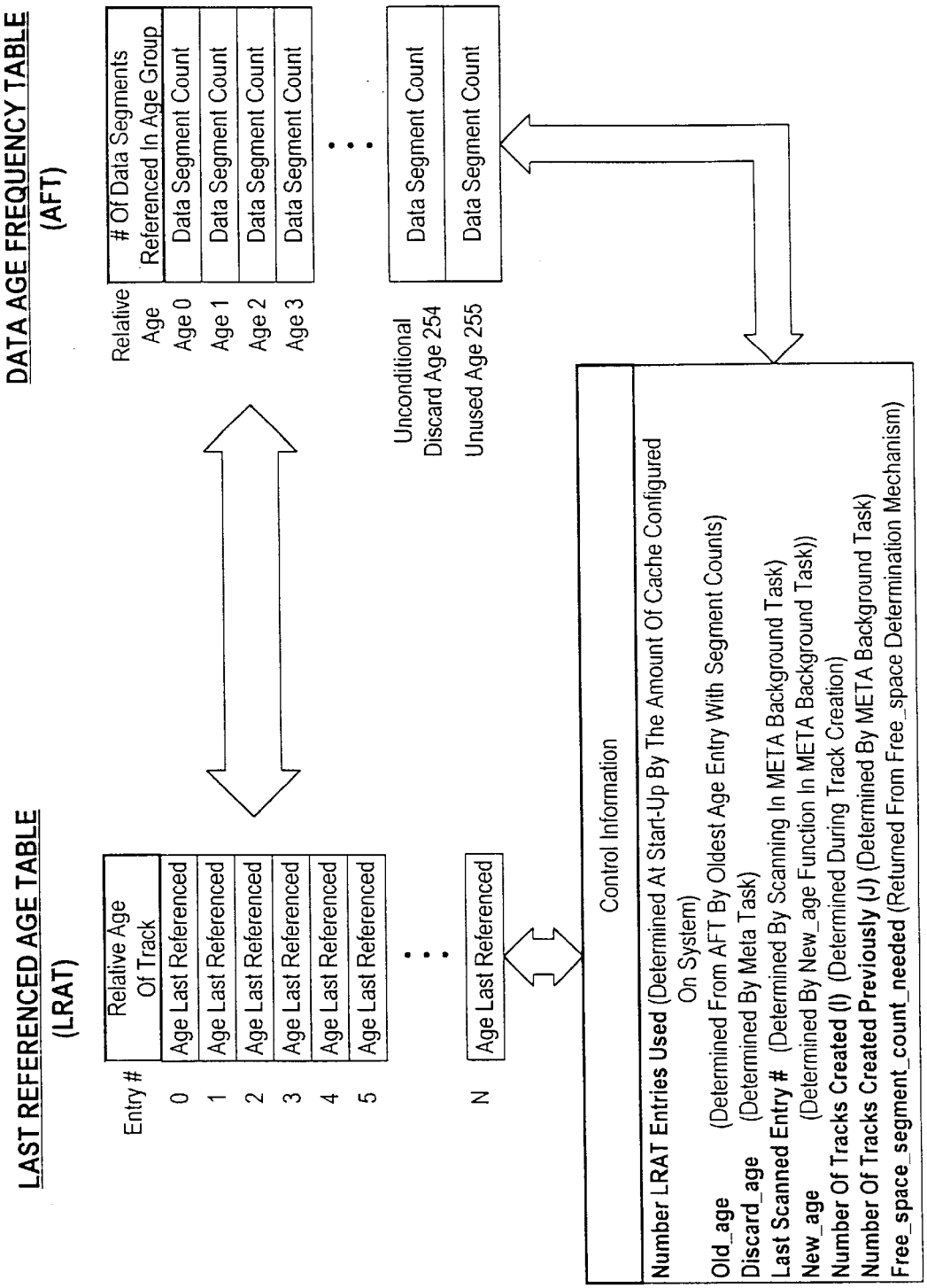
FIG. 5 is a logic diagram depicting the logical interaction between the LRAT and AFT and the utilization of control information needed for implementing the META process.

FIG. 5 is a logic diagram depicting the logical interaction between the LRAT and AFT and the utilization of control information needed for implementing the META process. FIG. 5 is similar to FIG. 3A in that the LRAT contains n entries of reference track ages. The AFT contains 256 entries of cumulative track size, or data segment counts, for tracks referenced during that reference age. Again, AFT entries 0–253 each contain the cumulative count of segments referenced during an age, AFT entry 254 contains the cumulative number segments designated by the processor for discard and AFT entry 255 contains the count of unused data segments. One of ordinary skill in the art will realize that the sum of all segments held in all AFT entries is equal to the number of segments supported by the cache configured on the system and changes as the system cache is reconfigured.

While the high level interaction between AFT and the LRAT has been depicted in FIG. 3B, a certain amount of control information is needed in order to implement the META process at lower levels and optimize the performance of META process. The control information used for these purposes, as well as a description of the particular information type, will be described below.

Initially, the control information includes the number of LRAT entries used. As alluded to above, the LRAT contains enough entries to hold reference ages for the maximum number of tracks that it is possible to hold in the system cache. However, depending on the configuration of the cache, the LRAT may contain more entries than are needed for the cache. In order to optimize the scanning process, which will be discussed in detail below, the LRAT may use only a specific number of LRAT entries, which is determined at start-up by the amount of cache configured on the system. Other control information needed by the processor for performing and optimizing the META process is old_age, which is determined from the AFT with the oldest age entry having segment counts. The discard_age is determined by the META task, which will be discussed in detail with respect to FIGS. 9A to 9D, as will the last scanned entry number and the new_age. The META new_age routine depicted in FIGS. 8A and 8B utilize the tracks created (I) and the number of tracks created previously (J). The value of I is determined during track creation while the value of J is also determined by the META new_age routine Finally, the free_space_segment_counts_needed is returned from the free_space determination mechanism located in the processor memory and used by the META task for determining an age range having the needed number of segment counts. This META task will be discussed in detail with respect to FIGS. 9A through 9D.

Figure 6A:
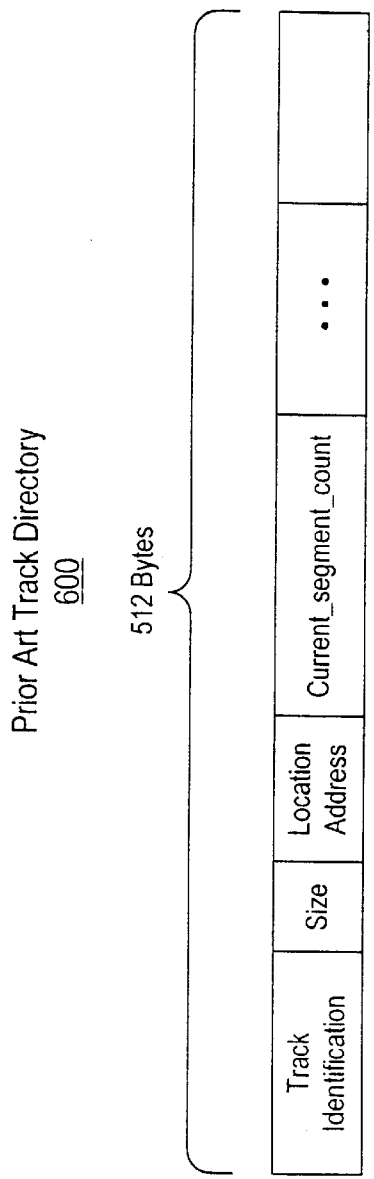
FIGS. 6A and 6B depict 512 byte primary directories in accordance with the prior art and the present invention respectively.
Figure 6B:
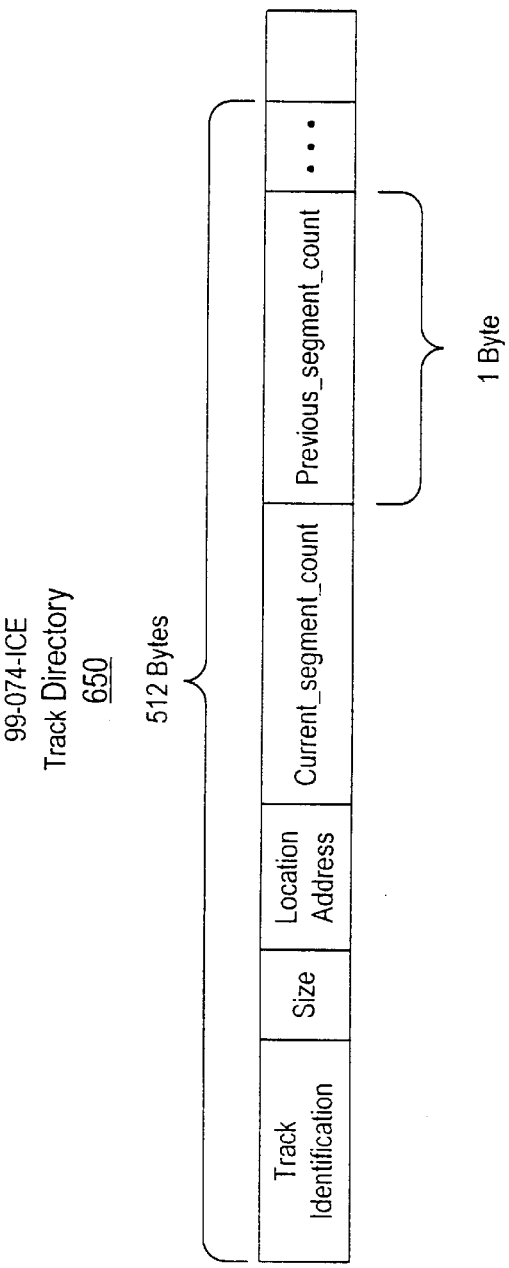

FIGS. 6A and 6B depict 512 byte primary directories in accordance with the prior art and the present invention respectively. A track directory is accessed by a processor for information related to the track. This information includes the track identification, its size, location, and current segment count. Note that the only difference between track directory 650 in accordance with a preferred embodiment of the present invention and prior art primary 600 is the addition of a 1-byte previous_segment_count.

When a track is referenced by a processor its size is subtracted from the cumulative size of the AFT entry for the track's previous age and added to the cumulative size of the AFT entry for new_age (the track's new reference age). However, as a track is referenced by a process its segment count may change from the last time it was referenced. Therefore, the META mechanism must save the track's previous size in order to accurately track the cumulative counts in the AFT. The 1-byte previous_segment_count saves that information.

Figure 7:
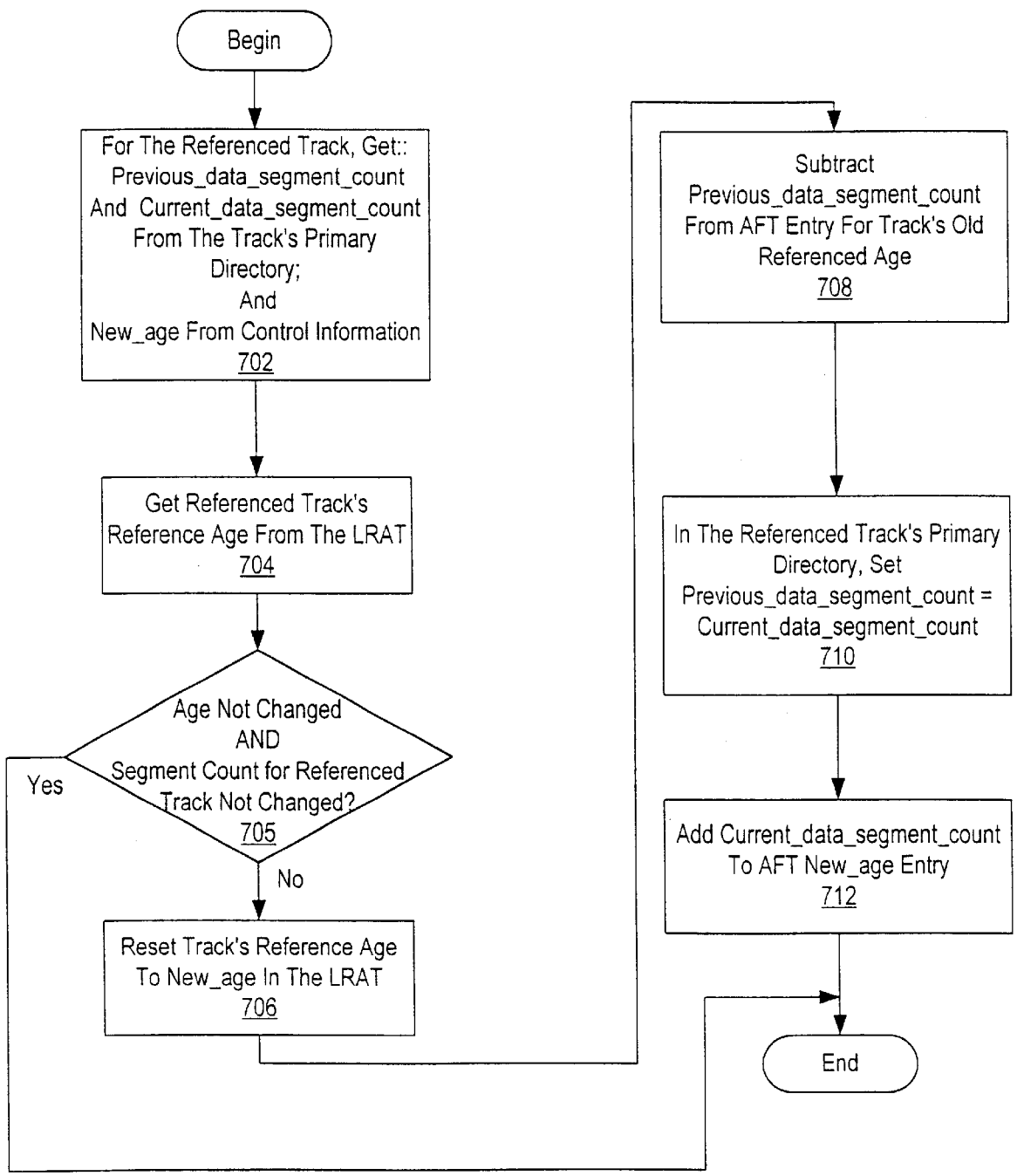
FIG. 7 is a flowchart depicting the META track aging function in accordance with a preferred embodiment of the present invention.

FIG. 7 is a flowchart depicting the META track aging function in accordance with a preferred embodiment of the present invention. The META track aging process is initiated when a processor references a track. The processor gathers the previous_data_segment_count and the current_segment_data_segment_count from the track directory, along with new_age from the control information (step 702). Next, the processor gets the track's last referenced age from the LRAT (step 704). Next, a test is performed to determine if both the value for new_age has not changed, and the current_segment_data_segment has not changed from the previous data_segment_count_count (step 705). If both conditions are met the process ends because there the values for the cumulative segment count in the entry for new_age and the previous new_age entry in the AFT are correct. However, if either of the conditions fail, the process continues by resetting the track's reference age to new_age at the track's entry in the LRAT (step 706).

Next, the previous_data_segment_count is subtracted from the cumulative data segment count of the AFT entry for the track's old reference age (step 708). As a track. is referenced from one age to another, the sum of all segments held in all AFT entries must remain equal to the number of segments supported by the cache configured on the system. As a track is referenced by the processor its size may change, therefore, the previous size or previous_data_segment_count of the track must be maintained in order to balance the cumulative segment count in the AFT entries.

After the previous_data_segment_count is subtracted from the cumulative data segment count of the AFT entry, the previous_data_segment_count is then set equal to the current_data_segment_count in the track directory (step 710). Finally, in order to completely balance the cumulative size of the track entry stored in the AFT, the currect_data_segment_count of the reference track is added to the cumulative size of the AFT entry for new_age (step 712). The process then ends.

In practice however, the previous_data_segment_count may be subtracted from the AFT entry for the track's old reference age and simultaneously added to the AFT unused age entry 255. The entire value of previous_data_segment_count is then available for use. The track's currect_data_segment_count is subtracted from AFT age 255 and added to the cumulative size of the track's new_age. Importantly, when a referenced track increases in size from its last referenced age, some mechanism must be available for keeping the cumulative AFT entries in balance while aging the track. Therefore, unless the track's previous_data_segment_count is exactly equal to the track's currect_data_segment_count, the cumulative size value of the unused entry 255 in the AFT must be adjusted for the difference in the previous size of the track and its new size.

Figure 8A:
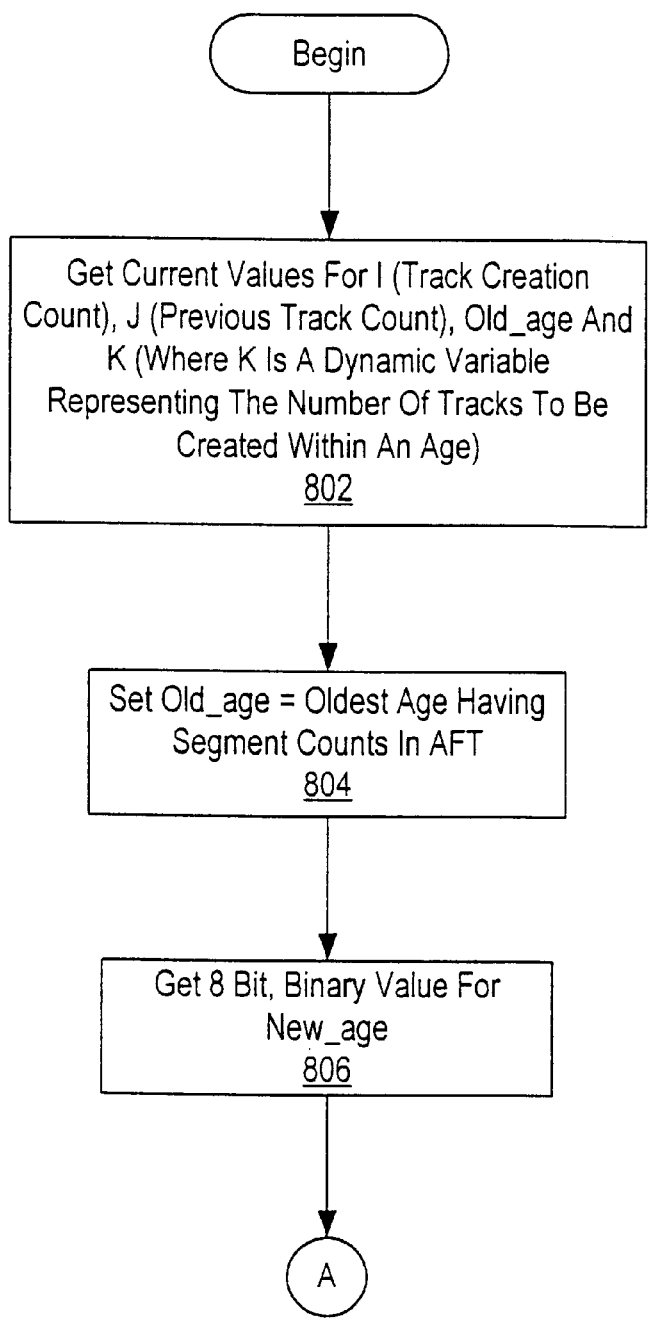
FIGS. 8A and 8B depict the META new_age function in accordance with a preferred embodiment of the present invention. Clearly a reference age value could be calculated merely as a function of time.
Figure 8B:
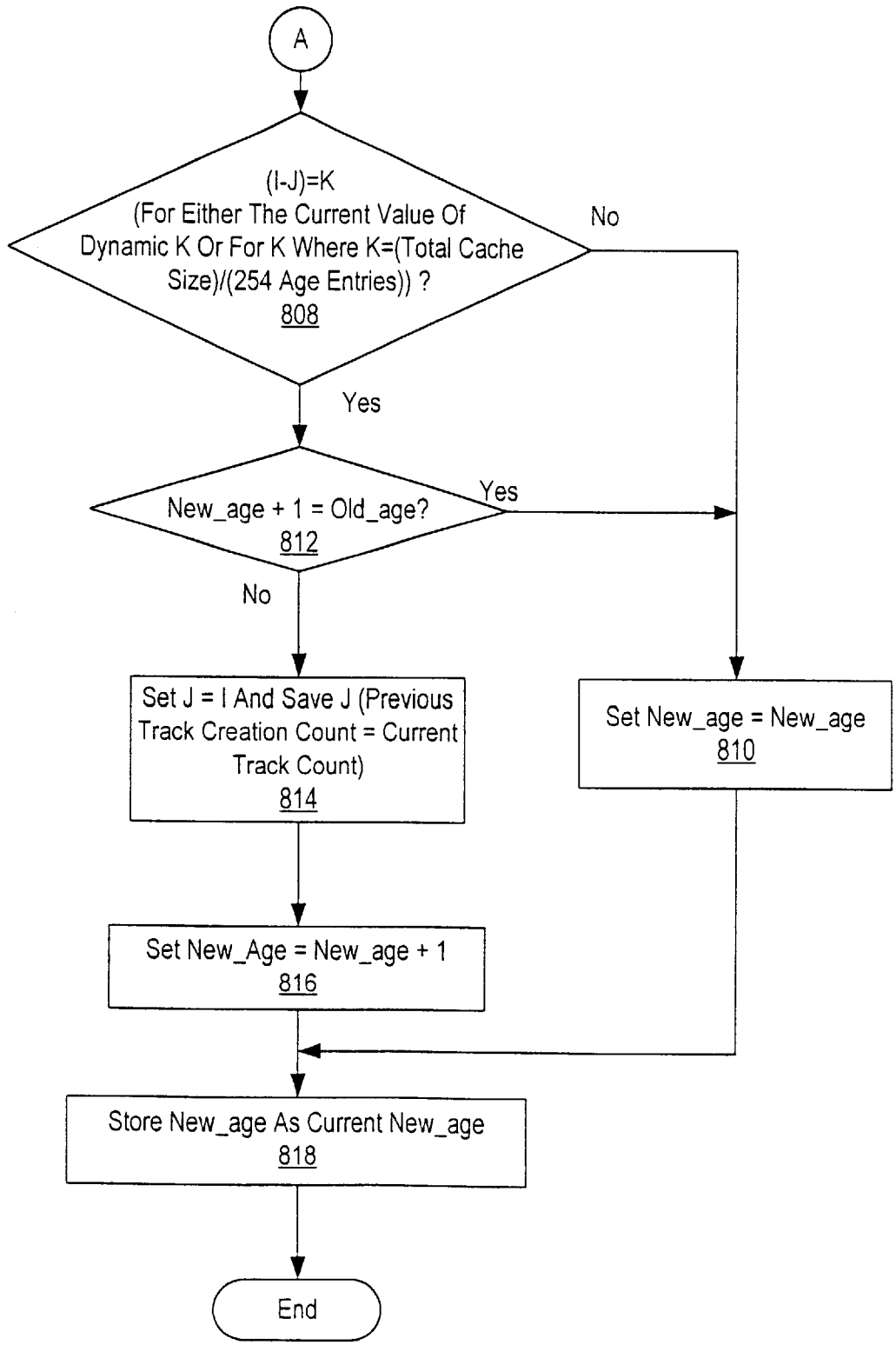
Figure 9A:
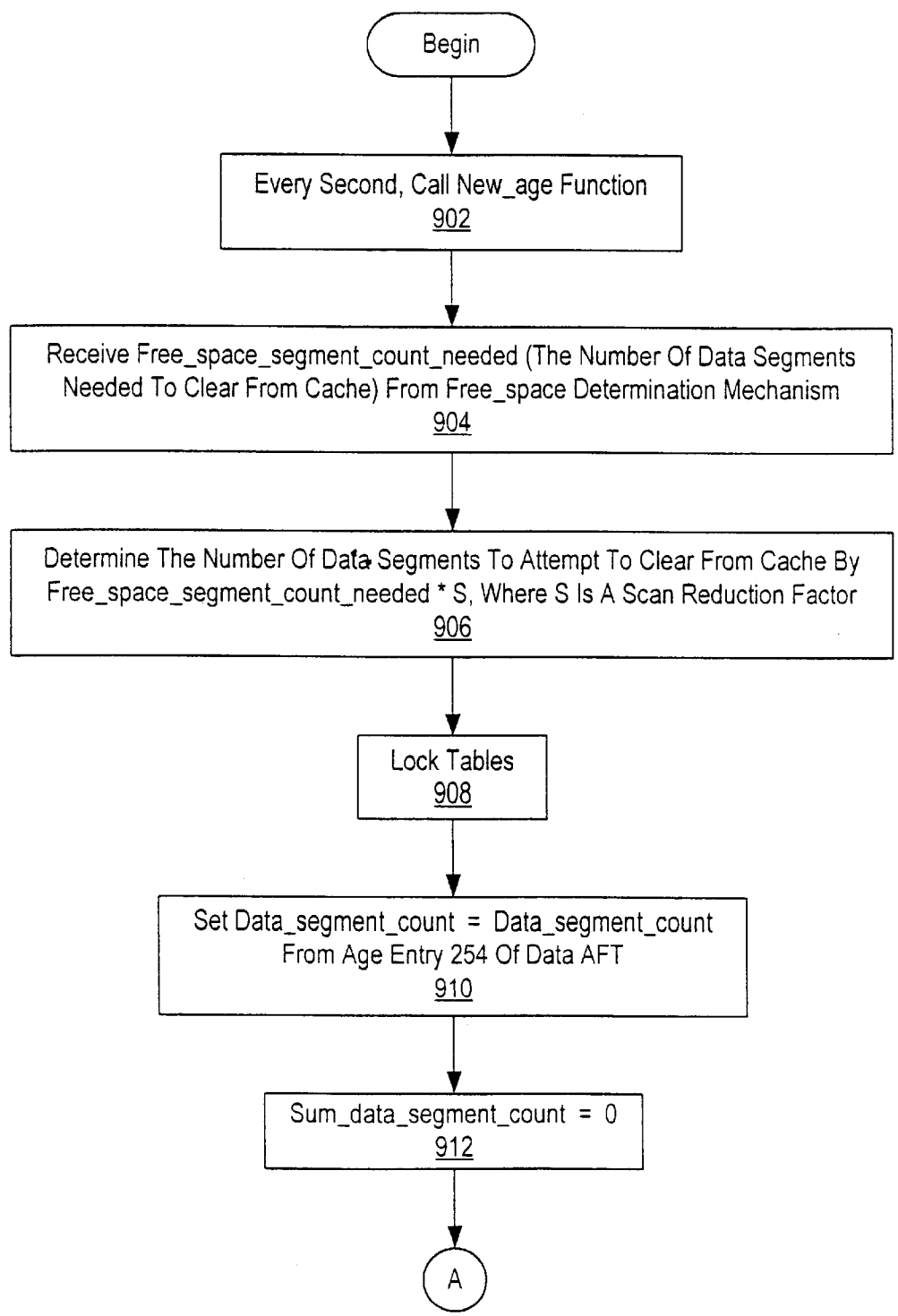
FIGS. 9A to 9D illustrate a flowchart, which depicts the META task in accordance with a preferred embodiment of the present invention.
Figure 9B:
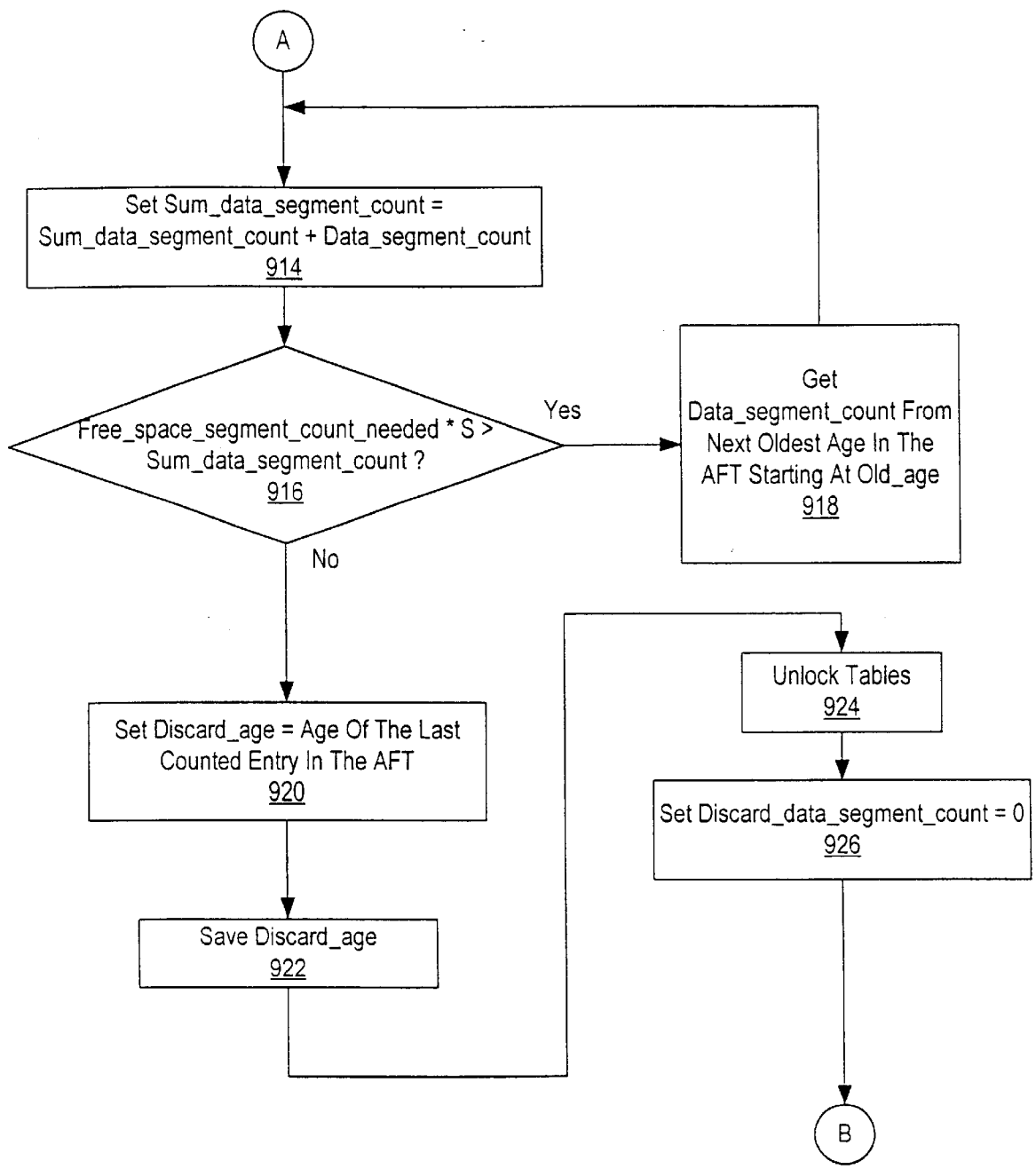
Figure 9C:
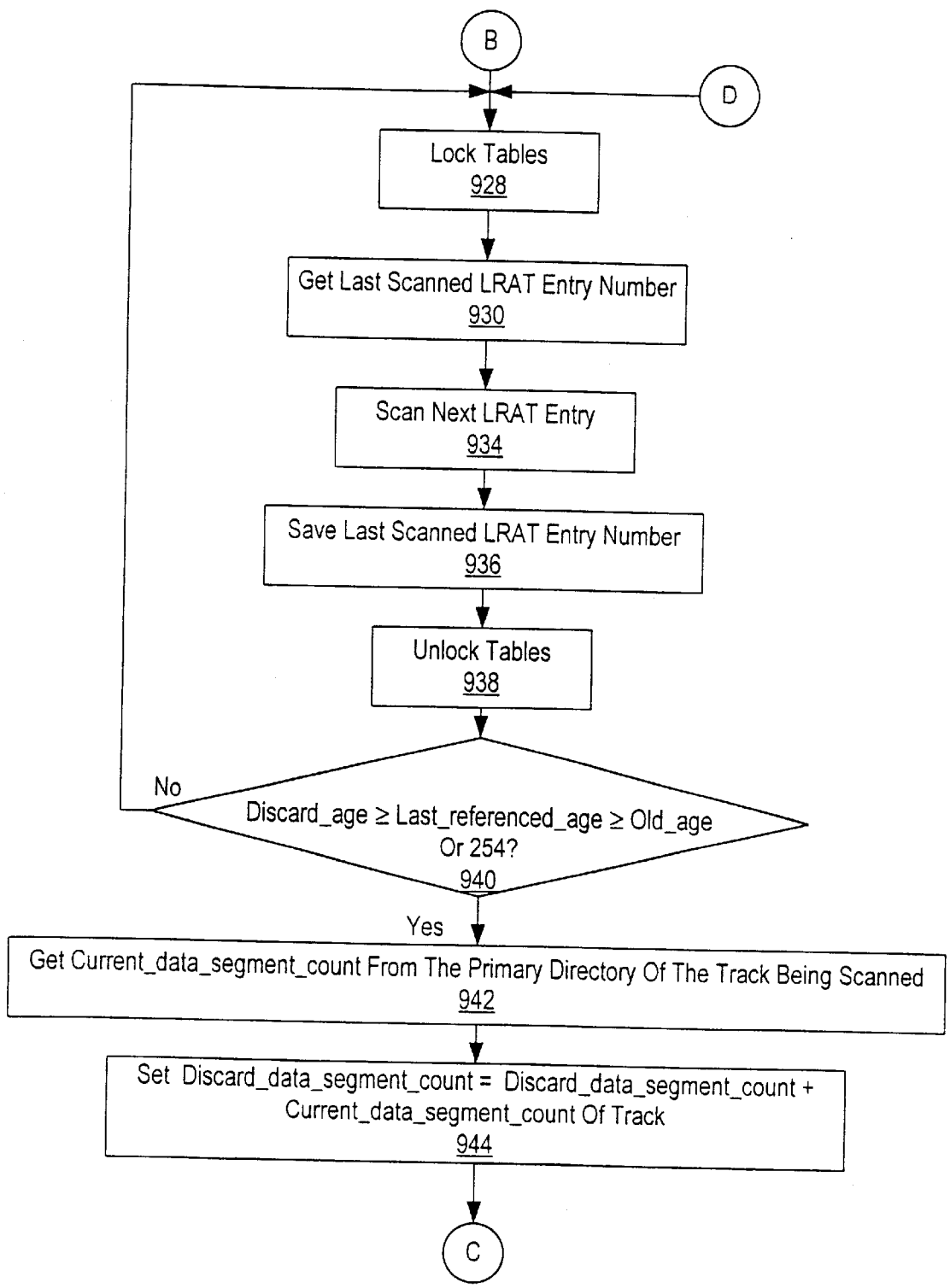
Figure 9D:
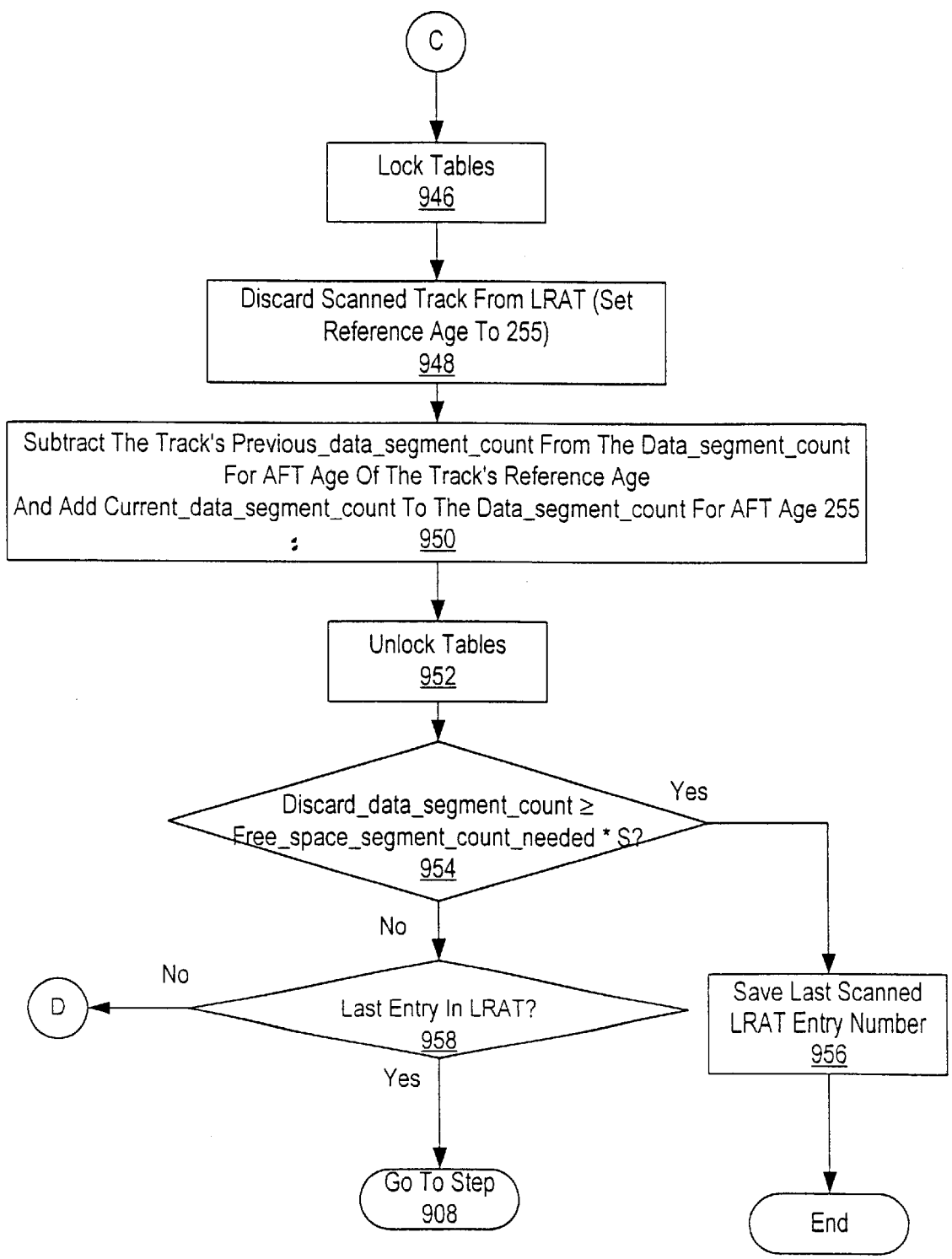

FIGS. 8A and 8B depict the META new_age function in accordance with a preferred embodiment of the present invention. Clearly a reference age value could be calculated merely as a function of time. In that case, the value of new_age would change automatically at preset time intervals. However, this causes the value of new_age to increase regardless of processor activity, therefore the cumulative sizes of AFT entries for those ages will be zero. The result is certain reference ages are underutilized and segment counts being unevenly distributed among the age entries in the AFT. The efficiency of the META task is reduced as a result.

For instance, the value of old_age might be 100. A typical time based aging function would increment the value of new_age from age 100 to age 253, then flip to age 0 and proceed on to age 99. However, once reaching age 99, new_age cannot be incremented to age 100 until old_age has been redefined as a higher value in order to .keep reference ages from having the same age value. Therefore, when the processor(s) is relatively inactive a time based aging function will cause a disproportionate number of tracks to be referenced during the age value just prior to value of old_age. This leads to the problem of end loading. End loading is where very few tracks are referenced in ages 100–253 and 0–98, but the new_age value cannot proceed to age 100 (the value of old_age), so all further tracks are referenced and counted in age 99. The problem remains unresolved until the free_space determination mechanism calls for some memory to be freed. However, because virtually all of the tracks are referenced to just one reference age 99, the age just prior to old_age, the discard age range might need to include age 99. Thus recently used tracks in cache might have to be discarded in order to free up enough memory to satisfy the memory request from the free_space determination mechanism.

Another function of the META new_age function is assuring that each AFT entry has a unique age value. No two AFT ages can have the same value, so the META new_age function must check to see that the next increment of new_age does not equal old_age. If so, new_age is held at its current value until the value of old_age changes.

Another feature of the META new_age function is flipping the 8-bit reference age value. In accordance with a preferred embodiment of the present invention, reference ages are stored as 8-bit values vary from 0–253. Once new_age reaches a value of 253 it flips to 0-age value. However, since no two ages in the AFT can have the same value and the value of old_age may be any value between 0 and 253, prior to flipping, the value of old_age must be checked.

Returning to FIGS. 8A and 8B, the META new_age function process begins with the processor accessing the control information values for I (tracks creation count), J (previous track creation count), old_age and K (the threshold number of tracks to be created prior to the value of new_age incrementing) (step 802). It is important to note that K can either be a static variable or dynamic variable. For instance, K may represent a total number of data segment counts that may be stored in cache divided by the total number of unique ages (254). Alternatively, K may also be a dynamic variable that's value changes depending on such parameters as processor activity or the new_age's proximity to old_age. For instance, as processor activity increases, K may also decrease which more evenly distributes the number of tracks referenced amongst the unique reference ages. Similarly, the value of K may increase as the value of new_age approaches the value of old_age. This reduces end loading at the age value just prior to old_age.

Next in the META new_age process, old_age is set equal to the oldest age having segment counts in the AFT (step 804) and the processor accesses the 8 bit binary for new_age (step 806). Next, the value of (I−J), or the total number of tracks created from start-up minus the tracks created in ages prior to new_age is compared to K (step 808). Of course, I minus J equals the number of tracks created during new_age. If the number of tracks created during new_age is not greater K, then the processor(s) has been relatively inactive and new_age will not be incremented. In that case, new_age is set equal to new_age (step 810) and the process flows to step 818, where the value of new_age stored as the current value of new_age.

However, even if the processor has been active enough to create K tracks during new_age, new_age may not necessarily be incremented because of the value of new_age may reach the value of old_age. Therefore, a check is made to determine if new_age plus 1 equals old_age (step 812). This check also takes account of the flip over case where the value old_age is 0. As discussed above, each age value in the AFT must be a distinct age value. No two entries can have the same value. Therefore, if the value of new_age plus 1 equals old_age, new_age is set equal to new_age (step 810), and the process then flows to step 818 where new_age is stored as the current value for new_age.

Returning to step 812, if the value of new_age plus 1 does not equal old_age, then the value for J is set equal to the value of I and J is saved (step 814). That is, because the value of new_age is incremented the previous track creation count becomes the current track creation count at the time new_age is incremented. Next, new_age is set equal to new_age plus 1 (step 816). Finally, new_age is saved as a current value of new_age (step 818), and the process ends.

FIGS. 9A to 9D illustrate a flowchart, which depicts the META task in accordance with a preferred embodiment of the present invention. The META task has two important functions. The first is to call the new_age function described below with respect to FIGS. 8A and 8B at regular time intervals and the second is to discard the oldest tracks from the LRAT based on the space requirement determined by the free space determination mechanism. The process begins by calling the new_age function every second (step 902). While the preferred embodiment calls the new_age function every second, the actual time interval may change depending on the needs and level of activity of the processor(s). Next, the META task will continue only if the free_space determination mechanism sends the number of data segments needed to be cleared from cache (or free_space_segment_count_needed) (step 904).

The value of free_space_segment_count_needed is then multiplied by a scan reduction factor (S) (step 906). By adopting a scan reduction factor the entire LRAT need not be scanned each time the free_space determination mechanism requests free_space_segment_count_needed from the META mechanism. The scan reduction factor reduces the number of entries in the LRAT that must be scanned in order to find the number of data segments needed to be cleared from cache by free_space_segment_count_needed. For instance, if the value of S is set at 4 and the age values were relatively evenly distributed throughout the LRAT, then the processor need only scan through one fourth of the number of entries used in order to find free_space_segment_count_needed.

The tables are then locked in order to prevent two processors from working on the tables simultaneously (step 908). As discussed above, the present invention may be implemented through a single processor or through a multi-processor array. With respect to the multi-processor embodiment, the tables must be locked when a processor accesses table values to prevent another processor from changing the values being relied upon by the first processor. Of course, the locking and unlocking of the tables may be dispensed with in the single processor mode.

A variable data_segment_count is then set equal to the value of data_segment_count from the age entry 254 of the AFT (step 910). Data_segment_count is the count of data segments from the AFT entry being accessed by the processor; at this point it is AFT entry 254. Remember that entry 254 of the AFT holds the unconditional discard data segment count and therefore is the first age to be considered for discarded in order to make space available in cache. Next, a variable sum_data_segment_count is set equal to 0 (step 912). Sum_data_segment_count maintains a count of all segments designated to be discarded. The process then flows to FIG. 9B where the variable sum_data_segment_count is set equal to sum_data_segment_count plus data_segment_count (step 914). In the first pass the value of sum_data_segment_count is set to the value of the unconditional discard data_segment_count found in AFT entry 254. Next, the value of free_space_segment_count_needed times the scan reduction factor (S) is compared to the current value of sum_data_segment_count (step 916). If the value of free_space_segment_count_needed times S is greater that sum_data_segment_count, then the current value of sum_data_segment_count must be increased by including count from other reference ages. The process then flows to step 918 wherein the processor gets the value of data_segment_count from the next oldest age in the AFT, starting of course with old_age. So, in the first pass of the META task, the processor will move from the unconditional discard_age of 254 to the old_age entry in the AFT. The process then flows again to step 914 where the value of sum_data_segment_count is reset equal to the value of sum_data_segment_count plus data_segment_count. In other words, in the second pass, the number of segment counts obtained from age 254 is increased by the number of segment counts stored at the old_age AFT entry.

Then, process again flows to step 916 where the check is again made to determine whether free_space_segment_count_needed times S is greater than the new value of sum_data_segment_count. If not, the process continues to iterate through steps 918, 914 and 916 until the value of sum_data_segment_count is greater than or equal to the value of free_space_segment_count_needed times S.

Once the value of sum_data_segment_count is greater than or equal to the value of free_space_segment_count_needed times S, the process flows to step 920 where the discard_age is set equal to the last age counted in the AFT. The discard age is then saved (step 922), and the tables are unlocked (step 924). The age range between old_age and discard_age is considered the discard age range.

As the LRAT is scanned, a track will be discards if its reference age is either an age of 254 (the unconditional discard age) or an reference age within the discard age range. As tracks are discarded by scanning the LRAT, an equivalent amount of space equal to the size of the track made available for a new track in the cache.

Scanning the LRAT begins by setting discard_data_segment_count equal to 0 (step 926). The process then continues in FIG. 9C, where the tables are once again locked (step 928). The process then gets the last scanned LRAT entry number from the control information (step 930). The next LRAT entry is then scanned for the reference age (step 934) and that scanned LRAT entry number is saved (step 936). The tables are then unlocked (step 934).

Each time an LRAT entry is scanned, the reference age is checked to determine whether it is 254 or within the discard range in order to determine whether or not to discard the track entry in the LRAT being scanned. Therefore, a determination is made as to whether the value of last_reference_age is less than or equal to the value of discard_age and the value of last_reference_age is greater than or equal to the value of old_age (whether last_reference_age is within the discard age range), or if the value of the last_reference_age is equal to 254. If not the process reverts to step 928, where the tables are locked and the processor gets the last scanned LRAT entry number (step 930), scans the next LRAT entry number (step 934), saves the last scanned LRAT entry number (step 936) and then unlocks the table (step 938). That reference age value is again checked to determine whether its value lies within the discard age range or is 254.

The process continues until a reference age in the discard_age range or having a value of 254 is scanned out of an LRAT entry. The processor then gets the current data_segment_count from the track directory of the tract being scanned (step 942). Next, a variable for holding the number of segment counts being discarded (discard_data_segment_count) is set equal to discard_data_segment_count plus previous_data_segment_count of the track being scanned (step 944). The process is continued on FIG. 9D. There the tables are once again locked (step 946), and the current track being scanned in the LRAT is discarded and its reference age is set to 255 (step 948). Once the track's reference age has been changed to 255, signifying the track is unused, the track's previous_data_segment_count must be subtracted from the data_segment_count for the AFT age entry of the track's reference age.

Next the tables are unlocked (step 952) and a check is then made to determine whether the value for discard_data_segment_count is greater than or equal to free_space_segment_count_needed times S (step 954). If so, then enough data segments have been removed from the LRAT to satisfy the free_space requirement issued by the free_space determination mechanism. The process then ends.

However, if enough data segments have not been removed to meet the free_space requirement determined by the free_space determination mechanism, the process flows to step 958 where a determination is made as to whether the discarded entry is the last entry in the LRAT. If so, the process flows to step 908, where the tables are locked and a new dlocked and a new discard age range is calculated in the AFT and the META task continues. If the currently scanned entry in the LRAT is not the last entry in the LRAT, the process again flows to step 928 in FIG. 9C. There the tables are again locked and the LRAT continues to be scanned until the another track with a reference age either within the discard age range or 254 is found (steps 930–940). That track's data segment count is freed and the AFT age entries are again reconciled for the track's new reference age (unused 255) (steps 942–950). Finally, a check is again made at step 954 to determine whether the value for discard_data_segment_count is greater than or equal to free_space_segment_count needed times S If so, the process is suspended until requested again by the free_space mechanism when it determines it is running low on free_space. Otherwise, the META task iterates back through the process, scanning for another track to discard, reconciling the AFT entries and testing the free-space until enough data segments have been discarded, at which point the task is suspended until notified by the free_space mechanism when it runs low of available free space.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention, applies equally, regardless of the particular type of signal bearing media actually used to carry out the distribution. Examples of computer readable media include recordable-type media, such as a floppy disc, a hard disk drive, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for memory efficient memory unit aging comprising:

referencing a memory unit;

entering a current reference age value for a memory unit in a last referenced age table corresponding to a memory unit entry;

adding a current memory unit size value for the memory unit to a cumulative memory unit size value for the current reference age value in a current reference age value entry in an age frequency table.

2. The method recited in claim 1, wherein the age frequency table comprises M number of reference age value entries, thereby limiting space needed for accommodating the last reference age table and the age frequency table.

3. The method recited in claim 1, prior to entering a current reference age value the method further comprises:

determining a current reference age for the memory unit.

4. The method recited in claim 3, wherein determining a current reference age value further comprises:

calculating a number of memory units created in the last referenced table over a predetermined time interval; and incrementing a previous reference age value based the number of memory units created in the time interval.

5. The method recited in claim 1, further comprises:

acquiring a previous reference age for the memory unit;

acquiring a previous memory unit size value for the memory unit;

subtracting the previous memory unit size value of the memory unit from a cumulative memory unit size value for the previous reference age value in a previous reference age value entry in the age frequency table.

6. The method recited in claim 1, further comprises:

subtracting the current memory unit size value of the memory unit from a cumulative memory unit size value for a unused reference age value in an unused reference age value entry in the age frequency table.

7. The method recited in claim 5, further comprises:

computing a difference size value between the previous memory unit size value of the memory unit and the current memory unit size value for the memory unit; and adding the difference size value to a cumulative memory unit size value for an unused reference age value in an unused reference age value entry in the age frequency table.

8. The method recited in claim 1, further comprises:

referencing a second memory unit;

entering an unconditional discard reference age value for the second memory unit in a last referenced age table corresponding to a second memory unit entry;

adding a second current memory unit size value for the second memory unit to a cumulative memory unit size value for the unconditional discard reference age value in a unconditional discard reference age value entry in the age frequency table.

9. The method recited in claim 1, further comprises:

receiving a request for a freespace memory unit size value request; and performing a free space generation task.

10. The method recited in claim 9, wherein performing a free space generation task further comprises:

finding discard reference age range; and discarding at least one memory unit entry from the last referenced table, wherein at least one memory unit entry has a reference age value in the discard reference age range.

11. The method recited in claim 10, wherein discarding at least one reference age value farther comprises:

scanning the last referenced age table for at least one memory unit entry having a reference age value within the discard reference age range.

12. The method recited in claim 11, wherein scanning the last referenced age further comprises:

scanning for at least one memory unit entry having an unconditional discard age value.

13. The method recited in claim 10, wherein finding the discard reference age range further comprises:

determining a cumulative memory unit size value for the unconditional discard reference age value in a unconditional discard reference age value entry in the age frequency table;

determining an oldest reference age value entry in the age frequency table, wherein the oldest reference age is the oldest reference age value entry in the age frequency table having a cumulative memory unit size value greater than zero;

sequentially traversing reference age value entries in the age frequency table, wherein the sequence commences with the unconditional discard reference age value entry and proceeds from the oldest reference age value entry to the current reference age value entry in the age frequency table;

sequentially adding cumulative memory unit size value for each traversed reference age to a sum cumulative memory unit size value;

sequentially comparing the sum cumulative memory unit size value to the freespace memory unit size value for each traversed reference age value;

setting a discard reference age value as the reference age value entry where sum cumulative memory unit size value is equal to or greater than the freespace memory unit size value; and defining the discard reference age range as reference ages having a value from the oldest reference age value to the discard reference age value.

14. The method recited in claim 10, wherein finding the discard reference age range further comprises:

determining a cumulative memory unit size value for the unconditional discard reference age value in a unconditional discard reference age value entry in the age frequency table;

determining an oldest reference age value entry in the age frequency table, wherein the oldest reference age is the oldest reference age value entry in the age frequency table having a cumulative memory unit size value greater than zero;

sequentially traversing reference age value entries in the age frequency table, wherein the sequence commences with the unconditional discard reference age value entry and proceeds from the oldest reference age value entry to the current reference age value entry in the age frequency table;

sequentially adding cumulative memory unit size value for each traversed reference age to a sum cumulative memory unit size value;

increasing the freespace memory unit size value by a factor of S, wherein the increased value of the freespace memory unit size is the scan reduction memory unit size;

sequentially comparing the sum cumulative memory unit size value to the scan reduction memory unit size value for each traversed reference age value;

setting a discard reference age value as the reference age value entry where sum cumulative memory unit size value is equal to or greater than the can reduction memory unit size value; and defining the discard reference age range as reference ages having a value from the oldest reference age value to the current reference age value.

15. The method recited in claim 14, wherein S has a value greater than one.

16. The method recited in claim 14, wherein scanning the last referenced age table further comprises:

acquiring an identity of a last scanned memory unit entry; and commencing scanning of the last referenced age table from memory unit entry subsequent to the last scanned memory unit entry.

17. The method recited in claim 14, wherein scanning the last referenced age table further comprises:

ascertaining a last memory unit entry in the last referenced age table for supporting cache configured in the data processing system; and terminating scanning of the last referenced age table at the last memory unit entry.

18. A method for memory efficient memory unit aging comprising:
   starting the data processing system;
   setting each reference age value for all memory unit entries in the last referenced age table to an unused reference age value; and
   reconciling all cumulative memory unit size value for all reference age values for all reference age value entries in an age frequency table.

19. The method recited in claim 18 further comprises:
   referencing a memory unit to a current reference age value; and
   reconciling a cumulative memory unit size value for the current reference age value entry with the cumulative memory unit size value for the unused reference age value entry in the age frequency table.

20. The method recited in claim 19 further comprises:
   referencing a plurality of memory units to a plurality of current reference age value; and
   reconciling cumulative memory unit size values for the plurality of reference age value entries with the cumulative memory unit size value for the unused reference age value entry in the age frequency table.

21. The method recited in claim 20 further comprises:
   scanning the last referenced age table;
   discarding at least one memory unit entry in the last referenced table; and
   reconciling a cumulative memory unit size value for a last referenced age value entry for the discarded memory unit with tie cumulative memory unit size value for the unused reference age value entry in the age frequency table.

22. A data processing system for memory efficient memory unit aging comprising:
   at least one processor;
   a memory accessed by the processor;
   a last referenced age table stored in the memory, wherein the last referenced age table is indexed by memory unit identifiers and contains a reference age value associated with each memory unit identifier, the reference age value being a value of a last age that memory unit was referenced; and
   an age frequency table stored in the memory, wherein the age frequency table a plurality of entries are indexed by reference age values and each contains a cumulative memory unit size value associated with each reference age value, the cumulative memory unit size value being a cumulative size of all memory units referenced by the processor during that reference age.

23. The system recited in claim 22 wherein the age frequency table further comprises:
   an entry indexed by an unconditional discard reference age value and contains a cumulative memory unit size value associated with the unconditional discard reference age value entry, the cumulative memory unit size value being a cumulative size of all memory units defined by the processor as being discardable.

24. The system recited in claim 22 wherein the age frequency table further comprises:
   an entry indexed by an unused reference age value and contains a cumulative memory unit size value associated with the unused reference age value entry, the cumulative memory unit size value being a cumulative size of all memory units not referenced by the processor.

25. A data processing system for memory efficient memory unit aging comprising:
   referencing means for referencing a memory unit;
   entering means for entering a current reference age value for a memory unit in a last referenced age table corresponding to a memory unit entry;
   adding means for adding a current memory unit size value for the memory unit to a cumulative memory unit size value for the current reference age value in a current reference age value entry in an age frequency table.

26. The system recited in claim 25, wherein the age frequency table comprises M number of reference age value entries, thereby limiting space needed for accommodating the last reference age table and the age frequency table.

27. The system recited in claim 25, the system further comprises:
   determining means for determining a current reference age for the memory unit.

28. The system recited in claim 27, wherein the determining means for determining a current reference age value further comprises:
   calculating means for calculating a number of memory units created in the last referenced table over a predetermined time interval; and
   incrementing means for incrementing a previous reference age value based on the number of memory units created in the time interval.

29. The system recited in claim 25, further comprises:
   acquiring means for acquiring a previous reference age for the memory unit;
   acquiring means for acquiring a previous memory unit size value for the memory unit;
   subtracting means for subtracting the previous memory unit size value of the memory unit from a cumulative memory unit size value for the previous reference age value in a previous reference age value entry in the age frequency table.

30. The system recited in claim 25, further comprises:
   subtracting means for subtracting the current memory unit size value of the memory unit from a cumulative memory unit size value for a unused reference age value in an unused reference age value entry in the age frequency table.

31. The system recited in claim 29, further comprises:
   computing means for computing a difference size value between the previous memory unit size value of the memory unit and the current memory unit size value for the memory unit; and
   adding means for adding the difference size value to a cumulative memory unit size value for an unused reference age value in an unused reference age value entry in the age frequency table.

32. The system recited in claim 25, further comprises:
   referencing means for referencing a second memory unit;
   entering means for entering an unconditional discard reference age value for the second memory unit in a last referenced age table corresponding to a second memory unit entry;
   adding means for adding a second current memory unit size value for the second memory unit to a cumulative memory unit size value for the unconditional discard reference age value in a unconditional discard reference age value entry in the age frequency table.

33. The system recited in claim 25, further comprises:

receiving means for receiving a request for a freespace memory unit size value request; and performing means for performing a free space generation task.

34. The system recited in claim 33, wherein performing a free space generation task further comprises:

finding means for finding discard reference age range; and discarding means for discarding at least one memory unit entry from the last referenced table, wherein at least one memory unit entry has a reference age value in the discard reference age range.

35. The system recited in claim 34, wherein the discarding means for discarding at least one reference age value further comprises:

scanning means for scanning the last referenced age table for at least one memory unit entry having a reference age value within the discard reference age range.

36. The system recited in claim 35, wherein the scanning means for scanning the last referenced age further comprises:

scanning means for scanning for at least one memory unit entry having an unconditional discard age value.

37. The system recited in claim 34, wherein the finding means for finding the discard reference age range further comprises:

determining means for determining a cumulative memory unit size value for the unconditional discard reference age value in a unconditional discard reference age value entry in the age frequency table;

determining means for determining an oldest reference age value entry in the age frequency table, wherein the oldest reference age is the oldest reference age value entry in the age frequency table having a cumulative memory unit size value greater than zero;

traversing means for sequentially traversing reference age value entries in the age frequency table, wherein the sequence commences with the unconditional discard reference age value entry and proceeds from the oldest reference age value entry to the current reference age value entry in the age frequency table;

sequentially adding means for adding cumulative memory unit size value for each traversed reference age to a sum cumulative memory unit size value;

sequentially comparing means for comparing the sum cumulative memory unit size value to the freespace memory unit size value for each traversed reference age value;

setting means for setting a discard reference age value as the reference age value entry where sum cumulative memory unit size value is equal to or greater than the freespace memory unit size value; and defining means for defining the discard reference age range as reference ages having a value from the oldest reference age value to the current reference age value.

38. The system recited in claim 34, wherein the finding means for finding the discard reference age range further comprises:

determining means for determining a cumulative memory unit size value for the unconditional discard reference age value in a unconditional discard reference age value entry in the age frequency table;

determining means for determining an oldest reference age value entry in the age frequency table, wherein the oldest reference age is the oldest reference age value entry in the age frequency table having a cumulative memory unit size value greater than zero;

sequentially traversing means for traversing reference age value entries in the age frequency table, wherein the sequence commences with the unconditional discard reference age value entry and proceeds from the oldest reference age value entry to the current reference age value entry in the age frequency table;

sequentially adding means for adding cumulative memory unit size value for each traversed reference age to a sum cumulative memory unit size value;

increasing means for increasing idle freespace memory unit size value by a factor of S, wherein the increased value of the freespace memory unit size is the scan reduction memory unit size;

sequentially comparing means for comparing the sum cumulative memory unit size value to the scan reduction memory unit size value for each traversed reference age value;

setting means for setting a discard reference age value as the reference age value entry where sum cumulative memory unit size value is equal to or greater than the scan reduction memory unit size value; and defining means for defining the discard reference age range as reference ages having a value from the oldest reference age value to the current reference age value.

39. The system recited in claim 38, wherein S has a value greater than one.

40. The system recited in claim 35, wherein the scanning means for scanning the last referenced age table further comprises:

acquiring means for acquiring an identity of a last scanned memory unit entry; and commencing means for commencing scanning of the last referenced age table from memory unit entry subsequent to the last scanned memory unit entry.

41. The system recited in claim 35, wherein scanning the last referenced age table further comprises:

ascertaining means for ascertaining a last memory unit entry in the last referenced age table for supporting cache configured in the data processing system; and terminating means for terminating scanning of the last referenced age table at the last memory unit entry.

42. A data processing system for memory efficient memory unit aging comprising:

starting means for starting the data processing system;

setting means for setting each reference age value for all memory unit entries in the last referenced age table to an unused reference age value; and reconciling means for reconciling all cumulative memory unit size values for all reference age values for all reference age value entries in an age frequency table.

43. The system recited in claim 42 further comprises:

referencing means for referencing a memory unit to a current reference age value; and reconciling means for reconciling a cumulative memory unit size value for the current reference age value entry with the cumulative memory unit size value for the unused reference age value entry in the age frequency table.

44. The system recited in claim 43 further comprises:

referencing means for referencing a plurality of memory units to a plurality of current reference age value; and reconciling means for reconciling cumulative memory unit size values for the plurality of reference age value entries with the cumulative memory unit size value for the unused reference age value entry in the age frequency table.

45. The system recited in claim 44 further comprises:

scanning means for scanning the last referenced age table;

discarding means for discarding at least one memory unit entry in the last referenced table; and reconciling means for reconciling a cumulative memory unit size value for a last referenced age value entry for the discarded memory unit with the cumulative memory unit size value for the unused reference ago value entry in the age frequency table.

46. A data processing system for memory efficient memory unit aging comprising:

processor means for processing data and functions;

memory means for memorizing data, the memory means being accessible by the processor;

last referenced age table means for organizing last referenced age information stored in the memory means, wherein the last referenced age table means is indexed by memory unit identifiers and contains a reference age value associated with each memory unit identifier, the reference age value being a value of a last age that memory unit was referenced; and an age frequency table stored means for organizing age frequency information stored in the memory means, wherein the age frequency table a plurality of entries are indexed by reference age values and each contains a cumulative memory unit size value associated with each reference age value, the cumulative memory unit size value being a cumulative size of all memory units referenced by the processor during that reference age.

47. The system recited in claim 46 wherein the age frequency table means further comprises:

an entry indexed by an unconditional discard reference age value and contains a cumulative memory unit size value associated with the unconditional discard reference age value entry, the cumulative memory unit size value being a cumulative size of all memory units defined by the processor as being discardable.

48. The system recited in claim 46 wherein the age frequency table means further comprises:

an entry indexed by an unused reference age value and contains a cumulative memory unit size value associated with the unused reference age value entry, the cumulative memory unit size value being a cumulative size of all memory units not referenced by the processor.

49. A data processing system implemented computer program product for memory efficient memory unit aging comprising:

referencing instructions for referencing a memory unit;

entering instructions for entering a current reference age value for a memory unit in a last referenced age table corresponding to a memory unit entry;

adding instructions for adding a current memory unit size value for the memory unit to a cumulative memory unit size value for the current reference age value in a current reference age value entry in an age frequency table.

50. A data processing system implemented computer program product for memory efficient memory unit aging comprising:

starting instructions for starting the data processing system;

setting instructions for setting each reference age value for all memory unit entries in the last referenced age table to an unused reference age value; and reconciling instructions for reconciling all cumulative memory unit size value for all reference age values for all reference age value entries in an age frequency table.

* * * * *